United States Patent
Zhang (10) Patent No.: US 7,779,551 B2
(45) Date of Patent: Aug. 24, 2010

(54) TESTING APPARATUS FOR TESTING PERPENDICULARITY

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 172 days.

(21) Appl. No.: 12/205,132

(22) Filed: Sep. 5, 2008

(65) Prior Publication Data

US 2009/0277030 A1    Nov. 12, 2009

(30) Foreign Application Priority Data

May 12, 2008    (CN) .......................... 2008 1 0301540

(51) Int. Cl.
*G01B 5/25* (2006.01)
(52) U.S. Cl. ............................. 33/533; 33/1 BB; 33/551
(58) Field of Classification Search .................. 33/533, 33/501.05, 501.06, 501.6, 548, 549, 551–555, 33/573, 1 BB
See application file for complete search history.

(56) References Cited

U.S. PATENT DOCUMENTS

| | | | | |
|---|---|---|---|---|
| 3,474,540 A | * | 10/1969 | Newell | ......................... 33/555 |
| 5,377,419 A | * | 1/1995 | Hesseltine | .................... 33/535 |
| 7,340,843 B2 | * | 3/2008 | Zhang et al. | ................... 33/533 |
| 7,428,783 B2 | * | 9/2008 | Li et al. | ......................... 33/533 |
| 7,487,599 B1 | * | 2/2009 | Spirito | ......................... 33/640 |
| 7,610,691 B2 | * | 11/2009 | Zhang | .......................... 33/836 |
| 2008/0129315 A1 | * | 6/2008 | Zhang et al. | ................ 324/556 |
| 2009/0106995 A1 | * | 4/2009 | Zhang et al. | ................... 33/533 |
| 2009/0278558 A1 | * | 11/2009 | Lin et al. | ..................... 324/754 |

* cited by examiner

*Primary Examiner*—Amy Cohen Johnson
(74) *Attorney, Agent, or Firm*—Clifford O. Chi (57) ABSTRACT

A testing apparatus for testing perpendicularity of an end surface of a workpiece is disclosed. The testing apparatus includes an electrically conductive first reference piece defining two guide holes, and two testing units. The testing units are slidably engaged in the guide holes, so as to form two testing circuits. At a normal state, each testing circuit is closed, and each testing unit extends out of the guide hole for a distance, wherein the distance corresponds to an allowable perpendicularity tolerance. Each testing unit can be pushed to retract back to the guide holes by the end of the workpiece to cause the testing circuit to be opened. The opened state or closed state of each of the testing circuits will help show the status of the perpendicularity of the end surface of the workpiece.

15 Claims, 9 Drawing Sheets

TESTING APPARATUS FOR TESTING PERPENDICULARITY

BACKGROUND

1. Field of the Invention

The present invention relates to testing apparatuses and, more particularly, to a testing apparatus for testing perpendicularity.

2. Description of Related Art

In manufacturing, a workpiece may need to be inspected to determine if side surfaces of the workpiece are perpendicular to each other.

A hand tool, such as an L-square or an angle block, may be used for testing the perpendicularity of two surfaces. However, using hand tools for inspecting is inefficient and unfit for mass production.

DETAILED DESCRIPTION

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

Figure 1:
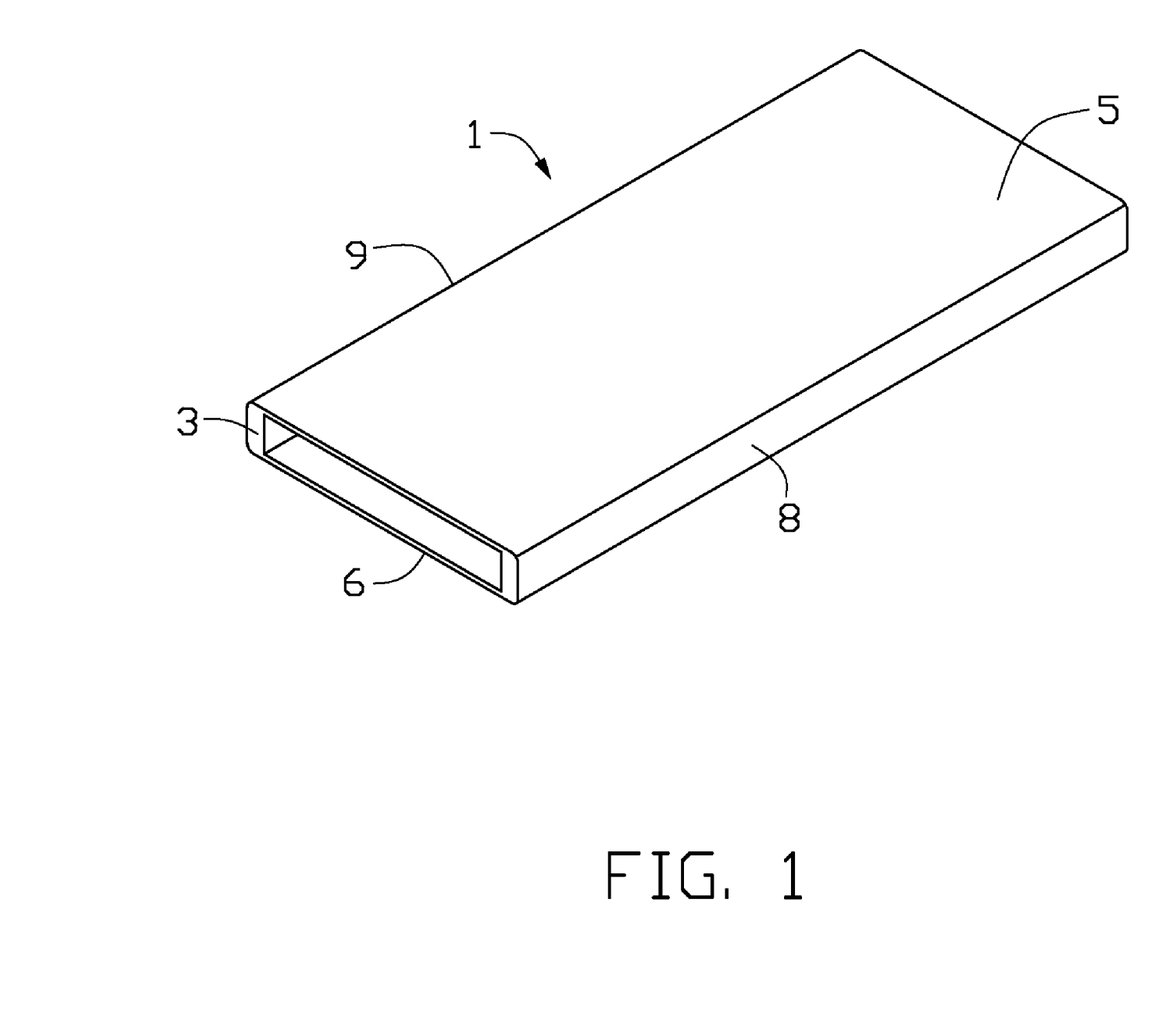
FIG. 1 is an isometric view of a workpiece.

Referring to FIG. 1, a workpiece 1 having an end surface 3 such as a cutting-off surface in manufacturing, a first side surface 5, a second side surface 6, a third side surface 8, and a fourth side surfaces 9 is shown.

Figure 2:
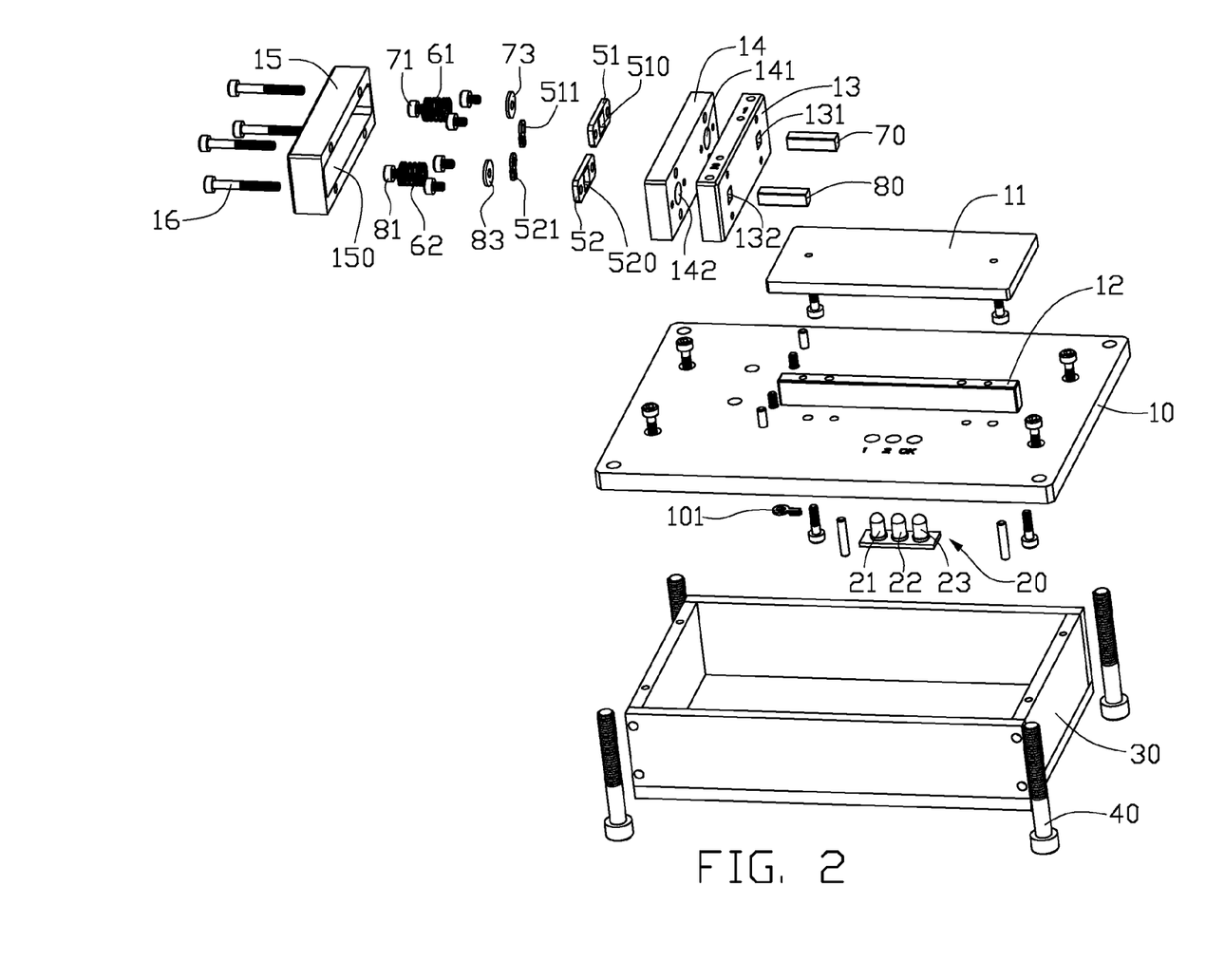
FIG. 2 is an exploded, isometric view of an embodiment of a testing apparatus.
Figure 3:
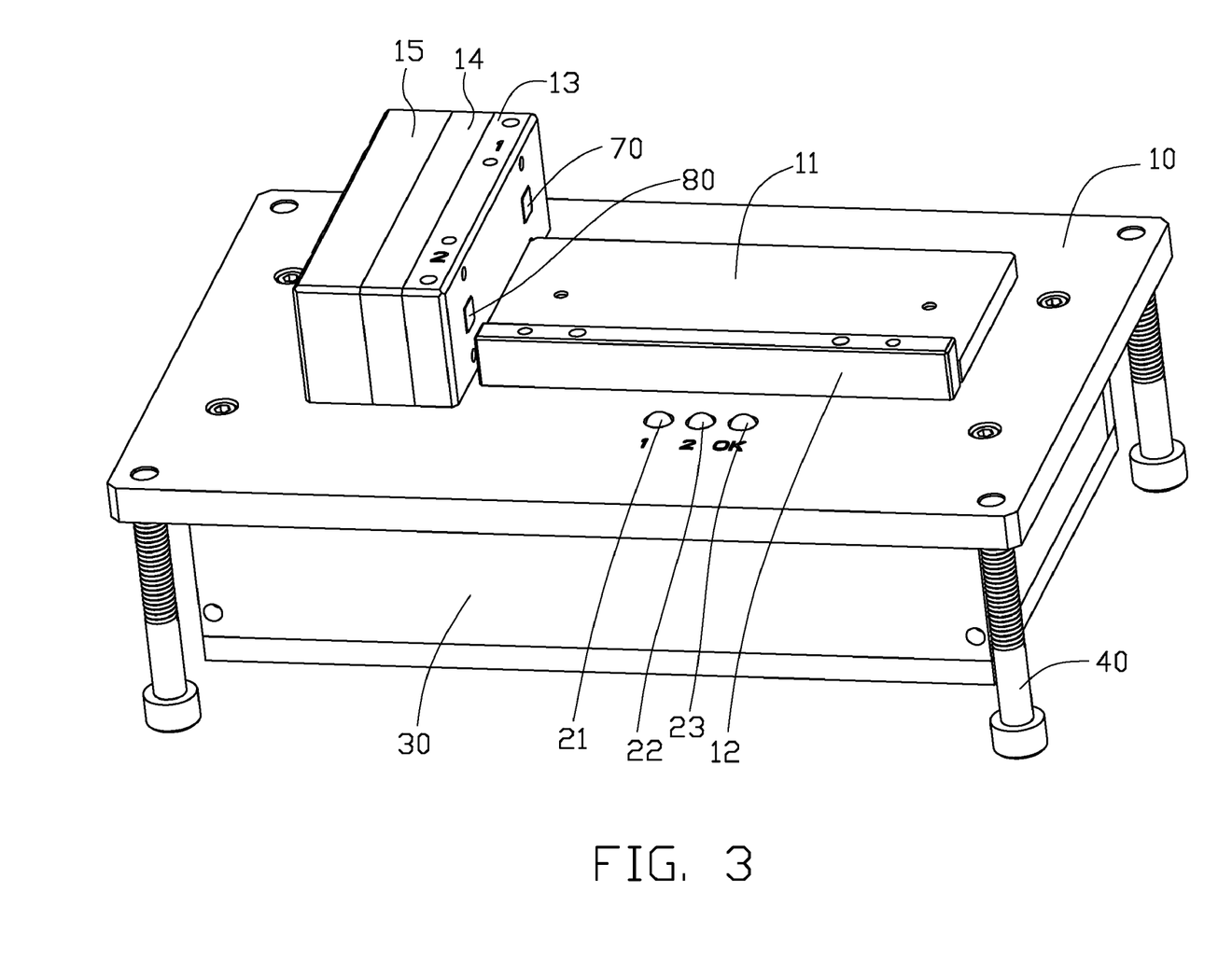
FIG. 3 is an assembled, isometric view of the testing apparatus of FIG. 2.

Referring to FIGS. 2 and 3, an embodiment of a testing apparatus may be used to test the perpendicularity of the end surface 3 relative to each of the first, second, third, and fourth side surfaces 5, 6, 8, 9. The testing apparatus includes a worktable 10 made of an electrically conductive material, a brick-shaped first reference piece 13 made of an electrically conductive material and fixed to the worktable 10, a sheet-shaped second reference piece 11 fixed to the worktable 10 and having an end adjacent to the first reference piece 13, a bar-shaped third reference piece 12 fixed to the worktable 10 adjacent to a side of the second reference piece 11, a container block 15 made of an electrically insulative material and fixed to the first reference piece 13, a nonconductive block 14 sandwiched between the first reference piece 13 and the container block 15, a first testing unit (not labeled), a second testing unit (not labeled), an indicator 20 mounted to the worktable 10, a control box 30 mounted to the bottom of the worktable 10, and four bolts 40 for supporting the worktable 10. The first reference piece 13, the nonconductive block 14, and the container block 15 are fixed together via a plurality of screws 16.

The worktable 10 includes a first contact 101 attached to a bottom surface of the worktable 10. The first contact 101 is grounded or connected to a low voltage level (not shown).

The first reference piece 13 defines two guide holes 131, 132 extending through the first reference piece 13. In one embodiment, the height between a center of the guide hole 131 and the second reference piece 11 is substantially equal to the height between a center of the guide hole 132 and the second reference piece 11. In other embodiments, the position of the guide holes 131, 132 may be defined in the first reference piece 13 to correspond to a shape of the workpiece.

The nonconductive block 14 defines a through hole 141 aligned with the guide hole 131 and a through hole 142 aligned with the guide hole 132.

The container block 15 defines a groove 150 facing the nonconductive block 14. The groove 150 includes two receiving holes 151, 152 (see FIG. 6). The receiving holes 151, 152 are defined in a wall 153 (see FIG. 6) of the groove 150, facing the nonconductive block 14. The receiving hole 151 is aligned with the guide hole 131 and the receiving hole 152 is aligned with the guide hole 132.

Figure 6:
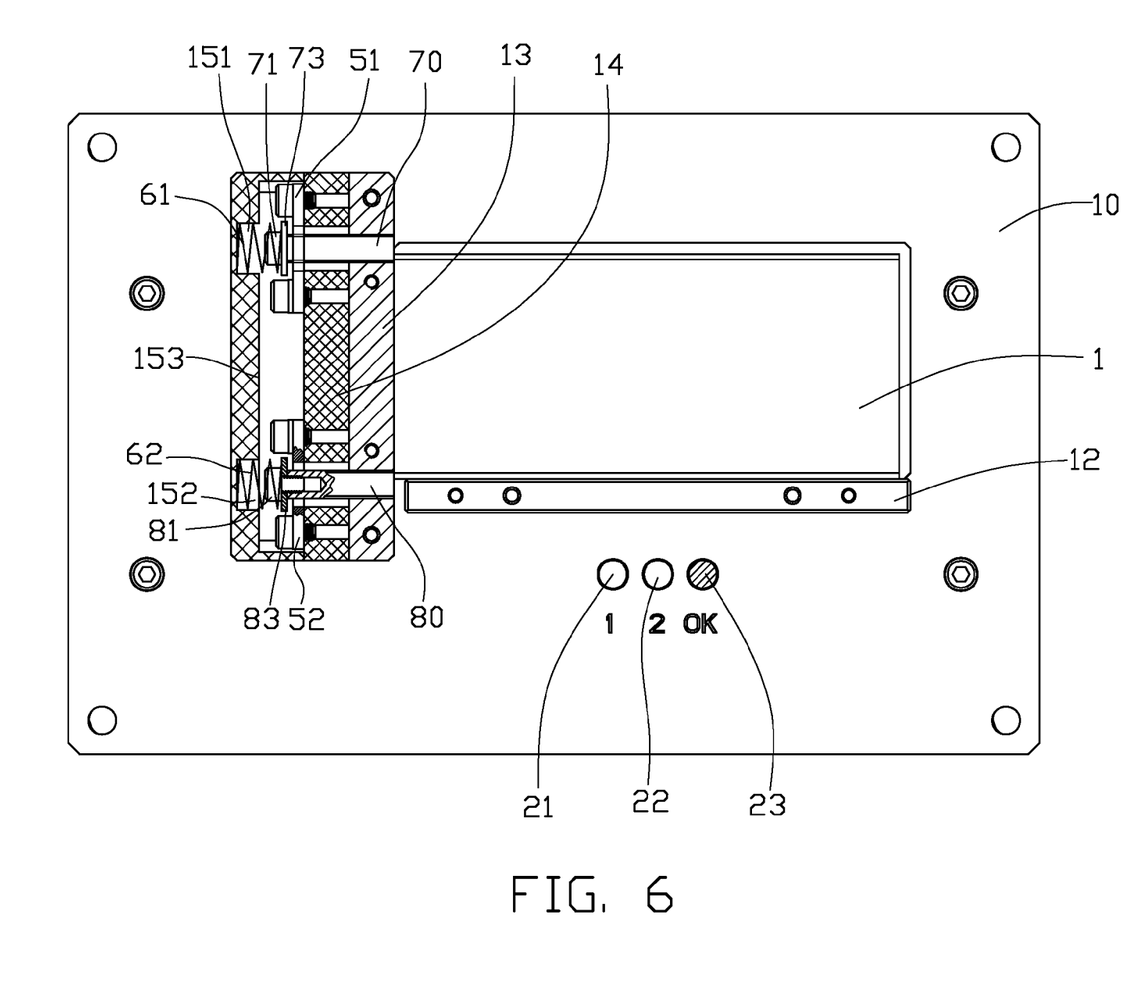
FIG. 6 is a cross-sectional view of the testing apparatus of FIG. 5 along the line VI-VI.

The first testing unit corresponds to the guide hole 131, the through hole 141, and the receiving hole 151 (see FIG. 6). The first testing unit includes a first trigger piece 51 made of an electrically conductive material, a first sliding member made of an electrically conductive material, and an elastic member 61.

Referring also to FIG. 6, the first trigger piece 51 is fixed to the nonconductive block 14 and received in the groove 150. The first trigger piece 51 defines a through hole 510 aligned with the guide hole 131. A cross-section of the hole 510 is greater than a cross-section of the guide hole 131. A second contact 511 attaches to the first trigger piece 51. The second contact 511 is connected to a high voltage level (not shown).

In one embodiment, the first sliding member includes a first testing block 70 slidably engaged in the guide hole 131, a first touching piece 73 defining a hole, and a screw 71. The first testing block 70 defines a screw hole in an end. The first trigger piece 73 is fixed to the first testing block 70 by screwing the screw 71 into the screw hole of the testing block 70. The head of the screw 71 forms an extending portion of the first testing block 70. In other embodiments, the first testing block 70, the first touching piece 73, and the extending portion may be integrally formed. The first testing block 70 does not come into contact with the first trigger piece 51 when sliding, because a size of the through hole 510 is greater a size of the first testing block 70.

The elastic member 61 may be a coil spring. A first end of the elastic member 61 is coiled around the head of the screw 71 and abuts against the first touching piece 73, and a second end is received in the receiving hole 151.

Figure 9:
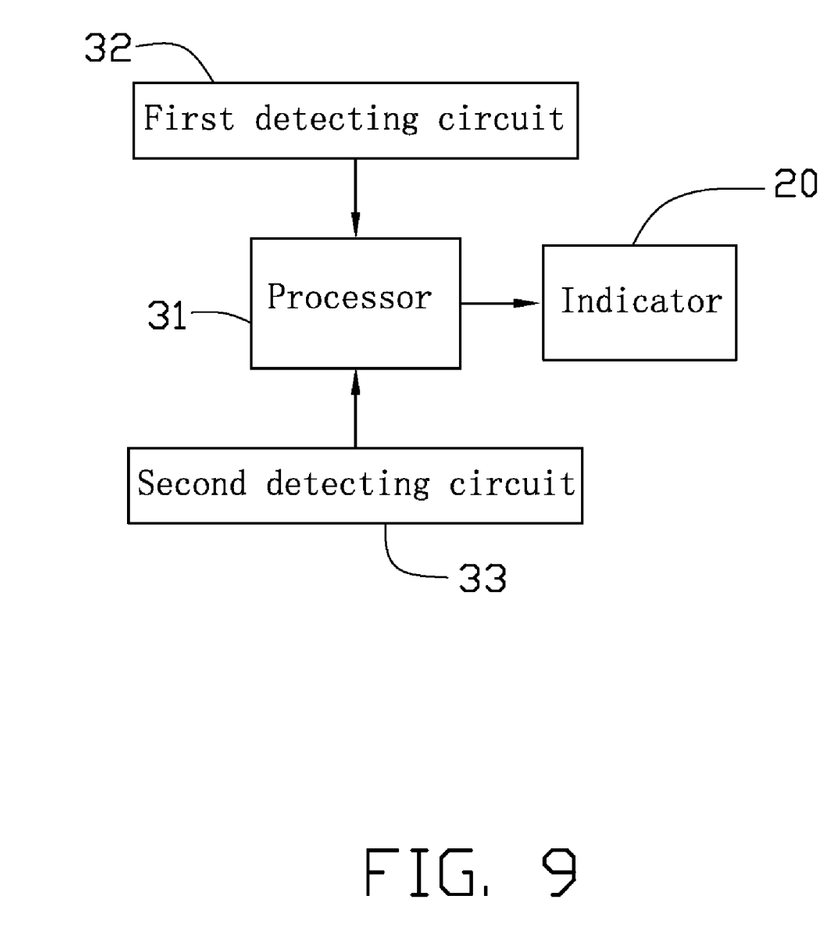
FIG. 9 is a block diagram of the testing apparatus of FIG. 3.

The first trigger piece 51 connected to the high voltage level via the second contact 511, the first touching piece 73, the first testing block 70, the first reference piece 13, and the worktable 10 connected to the low voltage level via the first contact 101 form a first testing circuit 32 (see FIG. 9). The first testing circuit 32 forms a closed circuit when the first trigger piece 51 contacts the first touching piece 73. The first testing circuit 32 forms an open circuit when the first touching piece 73 is not contacting the first trigger piece 51. At a normal state, the elastic member 61 pushes the first touching piece 73 to contact the first trigger piece 51 thus closing the first testing circuit, as well as pushing the first testing block 70 to extend out of the guide hole 131 to a distance δ (see FIG. 7). The distance δ is configured to correspond to a desired value of the allowable tolerance of the perpendicularity.

The second testing unit corresponds to the guide hole 132, the through hole 142, and the receiving hole 152 (see FIG. 6). The second testing unit includes a second trigger piece 52 made of an electrically conductive material, a second sliding member made of an electrically conductive material, and an elastic member 62

The second trigger piece 52 is fixed to the nonconductive block 14 and received in the groove 150. The second trigger piece 52 defines a through hole 520 aligned with the guide hole 132. A cross-section of the hole 520 is greater than a cross-section of the guide hole 132. A third contact 521 attaches to the second trigger piece 52. The third contact 521 is connected to a high voltage level.

In one embodiment, the second sliding member includes a second testing block 80 slidably engaged in the guide hole 132, a second touching piece 83 defining a hole, and a screw 81. The second testing block 80 defines a screw hole in an end. The second touching piece 83 is fixed to the second testing block 80 by screwing the screw 81 into the screw hole of the testing block 80. The head of the screw 81 forms an extending portion of the second testing block 80. In other embodiments, the second testing block 80, the second touching piece 83, and the extending portion may be integrally formed. Wherein the second testing block 80 does not come into contact with the second trigger piece 52 when sliding, because a size of the through hole 52 is greater a size of the first testing block 80.

The elastic member 62 may be a coil spring. A first end of the elastic member 62 is coiled around the head of the screw 81 and abuts against the second touching piece 83. A second end is received in the receiving hole 152 of the container block 15.

The second trigger piece 52 connected to the high voltage level via the third contact 521, the second touching piece 83, the second testing block 80, the first reference piece 13, and the worktable 10 connected to the low voltage level via the first contact 101 forms a second testing circuit 33 (see FIG. 9). The second testing circuit 33 forms a closed circuit when the second touching piece 83 contact the second trigger piece 52. The second testing circuit 33 forms an open circuit when the second touching piece 83 is not contacting the second trigger piece 52. At a normal state, the elastic member 62 pushes the second touching piece 83 to contact the second trigger piece 52 thus closing the second testing circuit, as well as pushing the second testing block 80 to extend out of the guide hole 132 to the distance δ.

The indicator 20 is configured to show the test result. The indicator 20 includes three lights 21, 22, 23.

Referring also to FIG. 9, a processor 31 is received in the control box 30. The processor 31 includes two inputs connected to the first and second testing circuits 32, 33, and an output connected to the indicator 20. The processor 31 controls the indicator 20 to show the test result according to the closed state or opened state of each of the first and second testing circuits 32, 33.

Figure 4:
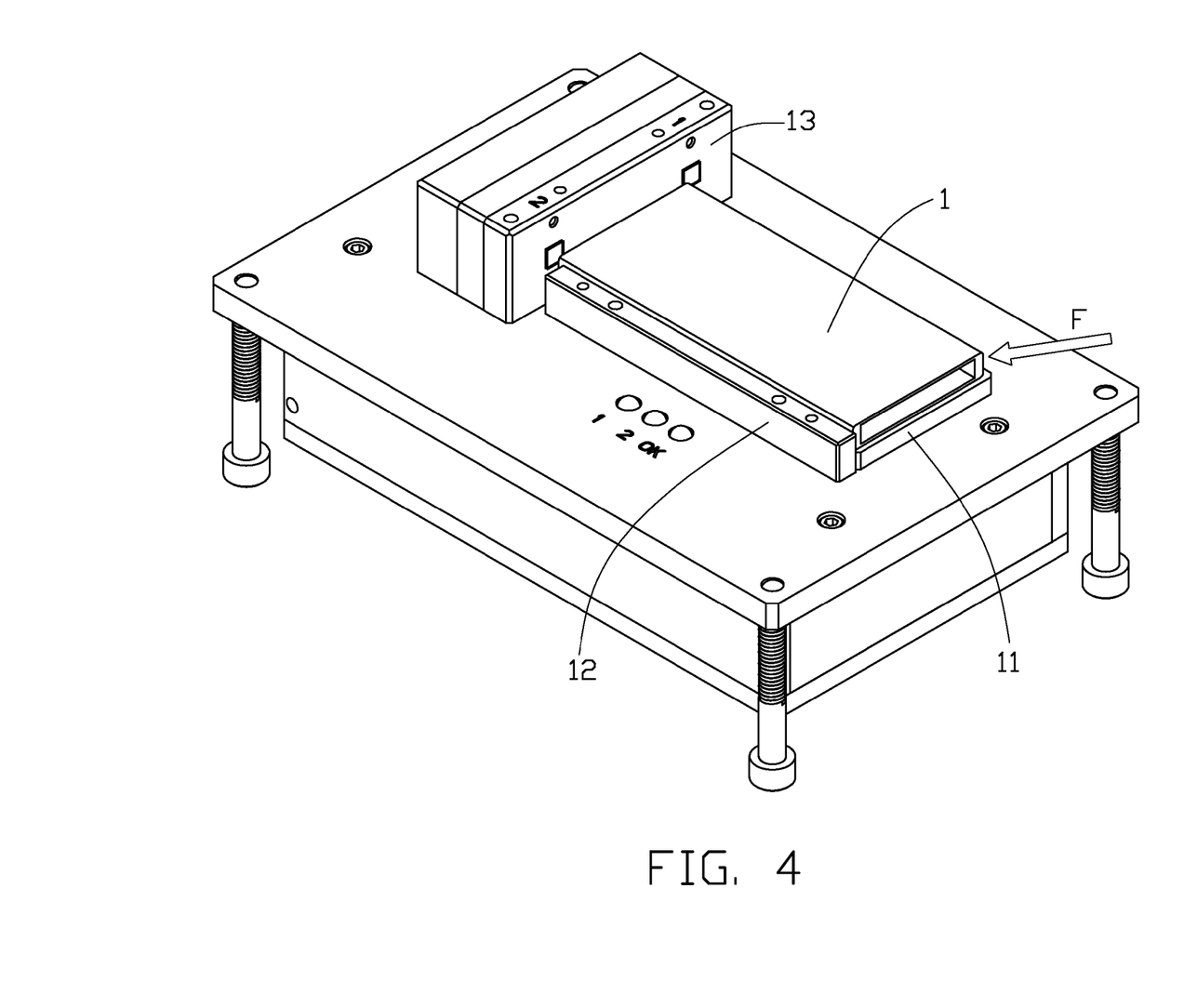
FIG. 4 is similar to FIG. 3, but showing the testing apparatus of FIG. 2 with the workpiece of FIG. 1.

Referring to FIGS. 1 and 4, there are two testing stages for completely inspecting the end surface 3 of the workpiece 1. At the first testing stage, the workpiece 1 is laid on the second reference piece 11 with the end surface 3 facing the first reference piece 13. A force F is used to drive the second side surface 6 to abut against an upper surface of the second reference piece 11, the third side surface 8 to abut against the third reference piece 12, and the end surface 3 to abut against the first reference piece 13. The end surface 3 is tested for a first time. At the second testing stage, the workpiece 1 is turned over and placed on the second reference piece 11. A force is used to drive the first side surface 5 to abut against the upper surface of the second reference piece 11, the fourth side surface 9 to abut against the third reference piece 12, and end surface 3 to abut against the first reference piece 13. The end surface 3 is tested for the second time. If the perpendicularity of the end surface 3 is satisfactory at both testing stages, the workpiece 1 passes the test.

Figure 5:
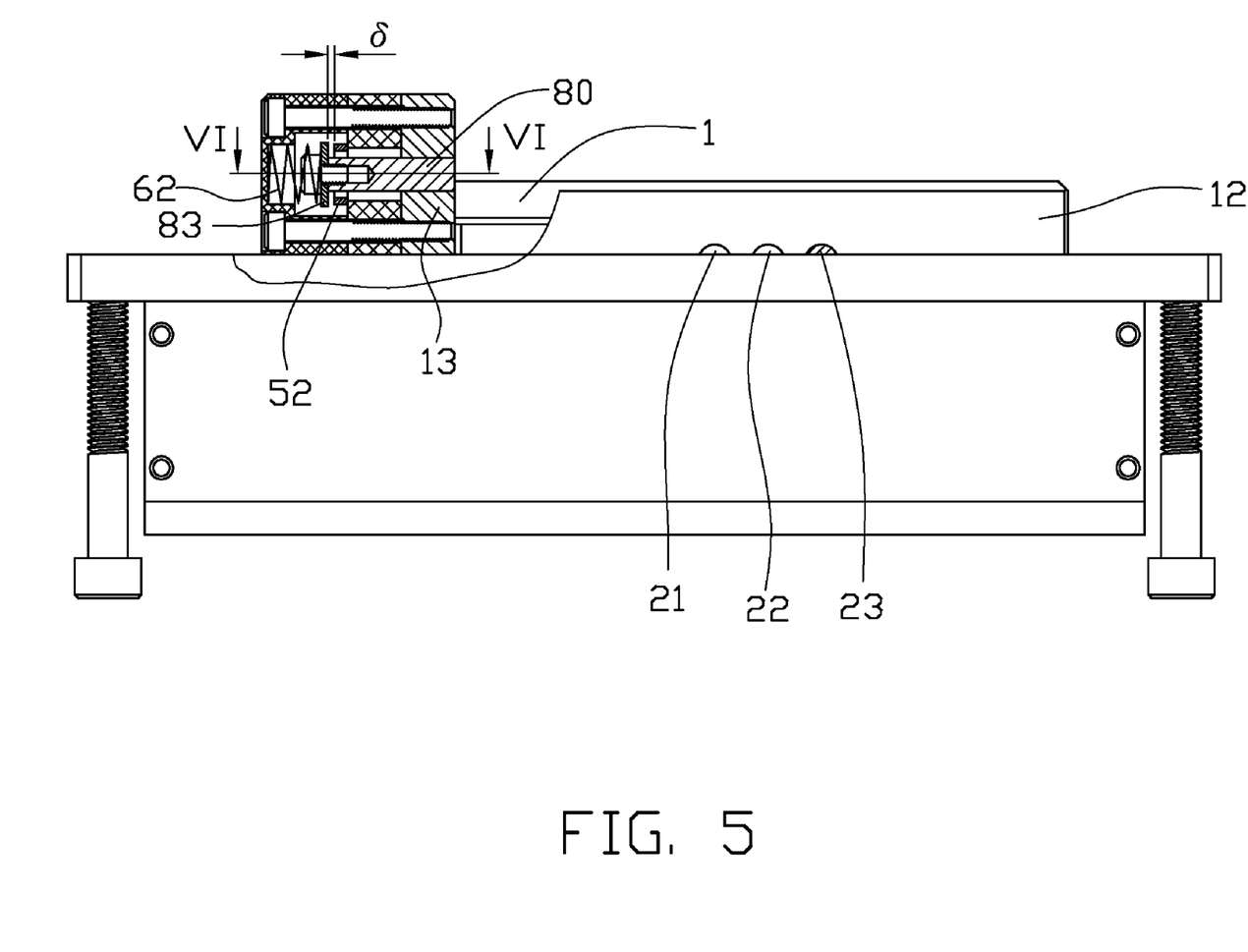
FIG. 5 is a side, partially cutaway view of FIG. 4.

Referring to FIGS. 5 and 6, at the first or second testing stage, if the perpendicularity of the end surface 3 is satisfactory, the end surface 3 pushes both the first and second testing blocks 70, 80 to retract into the corresponding guide holes 131, 132 against the elastic members 61, 62. Thus, the first touching piece 73 is driven by the first testing block 70 to be disengaged and separated from the first trigger piece 51, and the first testing circuit 32 becomes opened. The second touching piece 83 is driven by the second testing block 80 to be disengaged and separated from the second trigger piece 52, and the second testing circuit 33 becomes opened. The processor 31 controls the indicator 20 to turn the light 23 on and the lights 21, 22 off. The test result can be known by analyzing the lights 21, 22, 23. If the status is that the end surface 3 is satisfactory without any deviation, the testing blocks 70, 80 will be pushed to retract completely into the guide holes 131, 132. Thus, the distance between the first trigger piece 51 and the first touching piece 73, and the distance between the second trigger piece 52 and the second touching piece 83 will equal distance δ.

Figure 7:
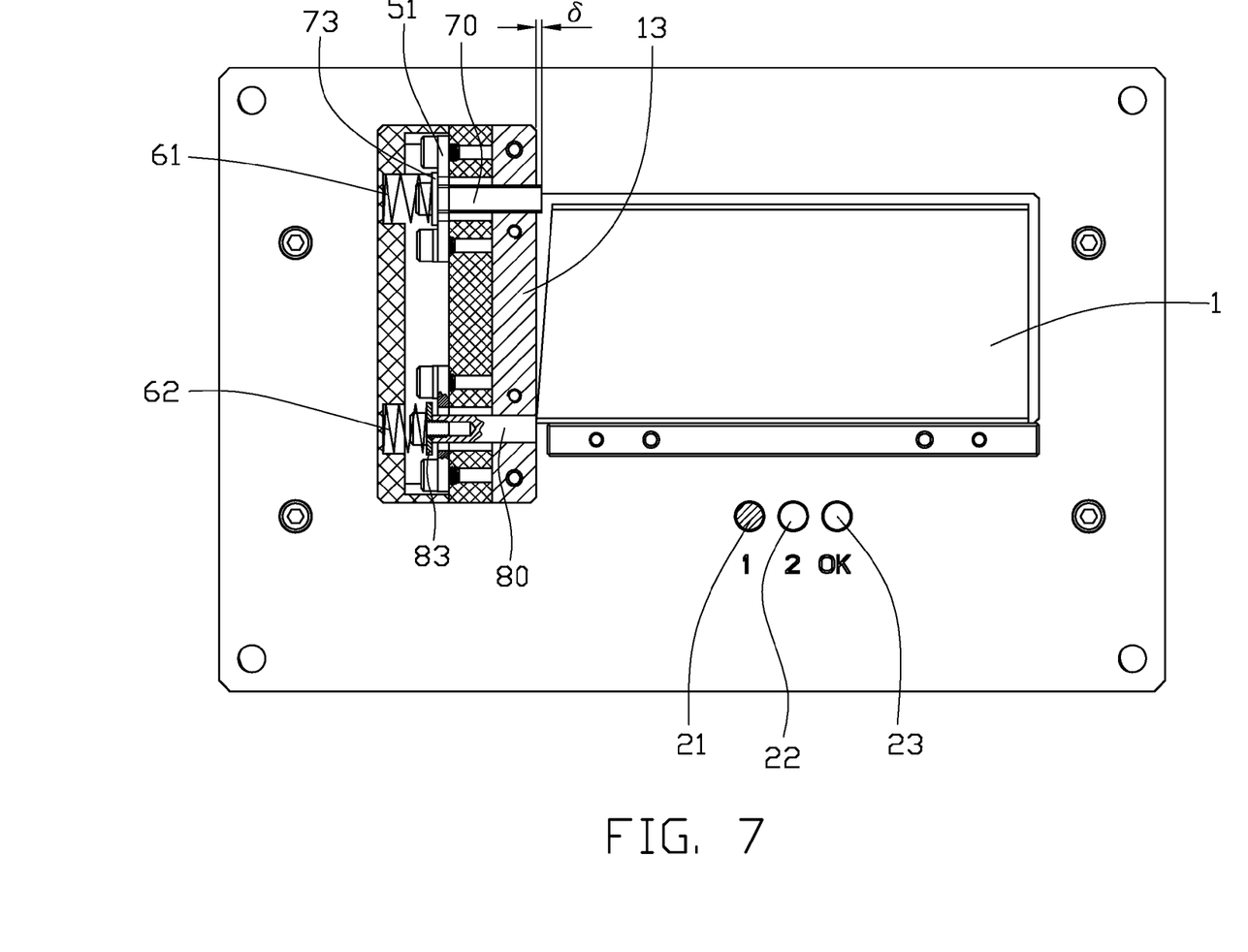
FIG. 7 is similar to FIG. 6, but showing the workpiece being unsatisfactory.

Referring to FIGS. 1 and 7, at the first or second testing stage, if the perpendicularity of the end surface 3 relative to the third side surface 8 (or the fourth side surface 9) is unsatisfactory, the workpiece 1 will not push one of the corresponding testing blocks 70, 80 away from the corresponding trigger piece 51, 52, so that the corresponding testing circuit 32, 33 will remain closed. FIG. 7 is an example showing a situation of this unsatisfactory status. The first testing block 70 of the first testing unit remains in the normal state and the first testing circuit 32 remains closed. The second testing block 80 of the second testing unit is pushed back into the guide hole 132 by the workpiece 1, and the second testing circuit 33 becomes opened. The processor 31 controls the indicator 20 to turn the light 21 on and the lights 22, 23 off. Under the same rationale, if the first testing block 70 of the first testing unit is pushed by the workpiece 1, and the second testing block 80 of the second testing unit remains in the normal state (this situation is not shown), the light 22 is turned on and the lights 21, 23 off. Thus, the test result can be known by analyzing the lights 21, 22, 23.

Figure 8:
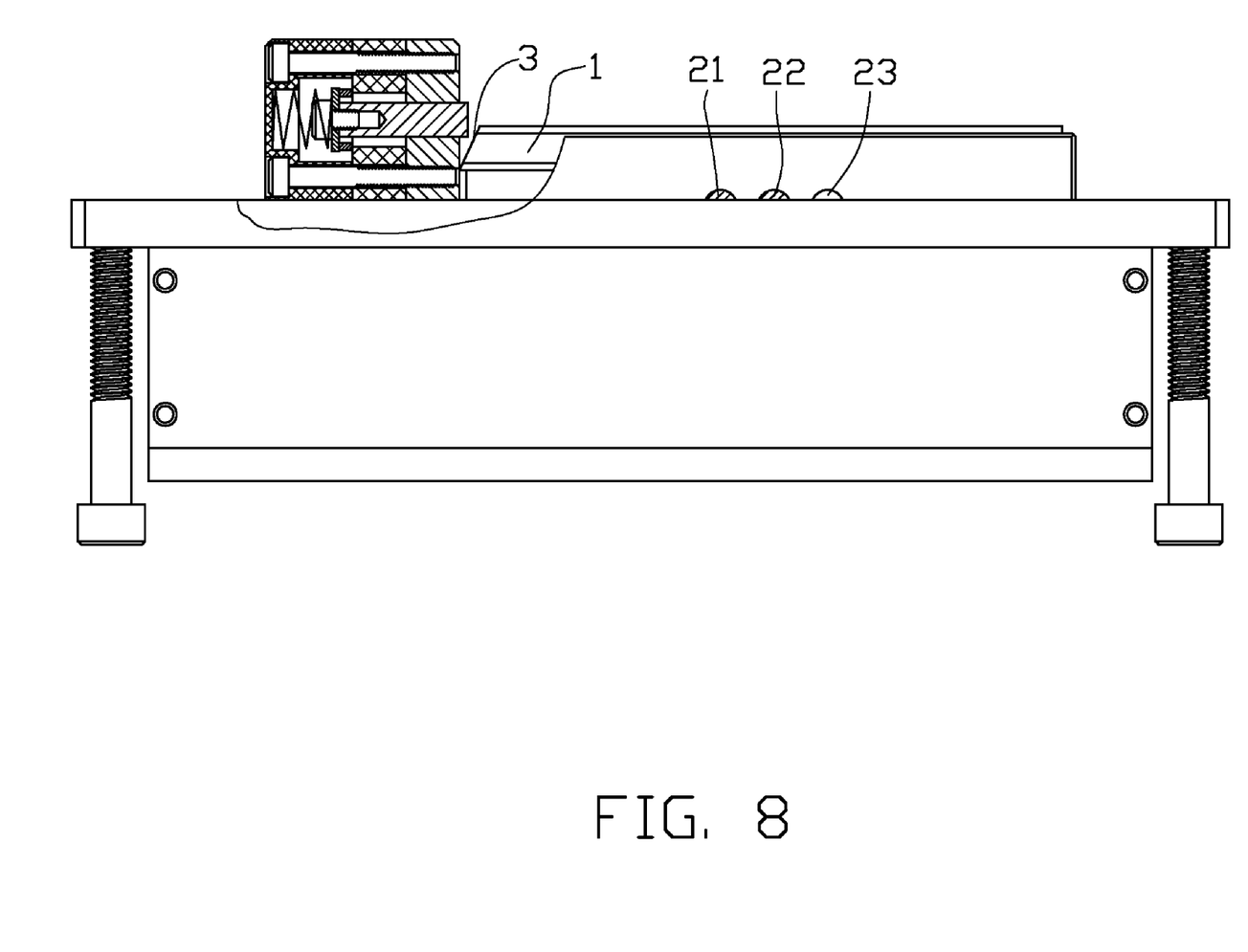
FIG. 8 is similar to FIG. 5, but showing the workpiece being unsatisfactory.

Referring to FIGS. 1 and 8, FIG. 8 shows both the first and second testing blocks 70, 80 not pushed by the workpiece 1 at the first or second testing stage, so that both of the corresponding testing circuits 32, 33 remain closed. In other words, the perpendicularity of the end surface 3 relative to the first side surface 5 (or the second side surface 6) is unsatisfactory. At this time, the processor 31 controls the indicator 20 to turn the lights 21, 22 on and the light 23 off.

After performing the two testing stages, it can be known if the perpendicularity of the end surface 3 is satisfactory, and if unsatisfactory, it can be known where it is not perpendicular.

It is believed that the present embodiments and their advantages is understood from the foregoing description, and it will be apparent that various changes may be made thereto without departing from the spirit and scope of the invention or sacrificing all of its material advantages, the examples hereinbefore described merely being exemplary embodiments of the invention.

What is claimed is:

1. A testing apparatus for testing perpendicularity of an end surface of a workpiece, comprising:

an electrically conductive first reference piece configured to be abutted against the end surface of the workpiece, wherein two guide holes are defined in the first reference piece; and two testing units, each testing unit comprising:

an electrically conductive trigger piece;

an electrically conductive sliding member; wherein the sliding member comprises a testing block, and a touching piece attached to the testing block; the testing block is slidably engaged in one of the guide holes of the first reference piece; and an elastic member;

wherein the trigger piece, the touching piece, the testing block, and the first reference piece cooperatively form a testing circuit; at a normal state, the elastic member biases the touching piece to contact the trigger piece to close the testing circuit, and to cause the first testing block to extend out from one of the guide holes to a distance, the distance corresponds to an allowable perpendicularity tolerance.

2. The testing apparatus of claim 1, further comprising an indicator configured to indicate a test result.

3. The testing apparatus of claim 2, wherein the indicator comprises three lights.

4. The testing apparatus of claim 2, further comprising a processor, wherein the processor is configured to control the indicator to indicate the test result according to a closed state or an opened state of each testing circuit.

5. The testing apparatus of claim 1, wherein each trigger piece defines a through hole corresponding to one of the guide holes; each testing block passes through the corresponding through hole to be engaged in the corresponding guide hole of the first reference piece.

6. The testing apparatus of claim 5, further comprising a container block, wherein the elastic member is sandwiched between the touching piece and the container block.

7. The testing apparatus of claim 6, further comprising a nonconductive block securely sandwiched between the first reference piece and the trigger piece.

8. The testing apparatus of claim 6, wherein each elastic member is a coil spring.

9. The testing apparatus of claim 8, wherein the container block defines two receiving holes, a first end of each elastic member is received in each receiving hole.

10. The testing apparatus of claim 9, wherein each sliding member further comprises an extending potion extending from the testing block; a second end of each elastic member is coiled around the extending potion.

11. The testing apparatus of claim 10, wherein each trigger piece is connected to a high voltage level, and the first reference piece is grounded or connected to a low voltage level.

12. The testing apparatus of claim 1, wherein each trigger piece grounded or connected to a low voltage level, and the first reference piece is connected to a high voltage level.

13. The testing apparatus of claim 1, further comprising a second reference piece configured to support the workpiece.

14. The testing apparatus of claim 13, further comprising a third reference piece configured to be abutted against a side surface of the workpiece.

15. The testing apparatus of claim 13, wherein the height between a centerline of a first of the guide holes and the second reference piece is substantially equal to the height between a centerline of a second of the guide holes and the second reference piece.

* * * * *